United States Patent [19]

Krolak et al.

[11] 4,134,622
[45] Jan. 16, 1979

[54] SCRAPING APPARATUS FOR TRACK-TYPE VEHICLES

[75] Inventors: Ronald L. Krolak, Morton; James T. Duke, Peoria; Arthur J. Ritter, Metamora, all of Ill.

[73] Assignee: Caterpillar Tractor Co., Peoria, Ill.

[21] Appl. No.: 763,479

[22] Filed: Jan. 28, 1977

[51] Int. Cl.² .............................. B60S 1/68; B60S 1/62
[52] U.S. Cl. ....................................................... 305/12
[58] Field of Search .......... 305/12; 280/158 R, 158 A, 280/158.1; 15/93 R

[56] References Cited
U.S. PATENT DOCUMENTS

| 841,958 | 1/1907 | Frommater | 280/158 R |
| 3,912,336 | 10/1975 | Ritter et al. | 305/12 |

FOREIGN PATENT DOCUMENTS

| 1059883 | 11/1953 | France | 280/158 R |
| 263161 | 4/1927 | United Kingdom | 305/12 |

Primary Examiner—Robert B. Reeves
Assistant Examiner—John P. Shannon
Attorney, Agent, or Firm—John L. James

[57] ABSTRACT

A scraping apparatus is provided for a track-type vehicle which has a track with a chain and shoes. The scraping apparatus has first and second scraping elements each having first and second opposed cutting edges. The first scraping element removes foreign material from the chain and the second scraping element removes foreign material from the shoes. The scraping apparatus removes foreign material during forward and rearward movement of the track.

8 Claims, 4 Drawing Figures

Fig-3-
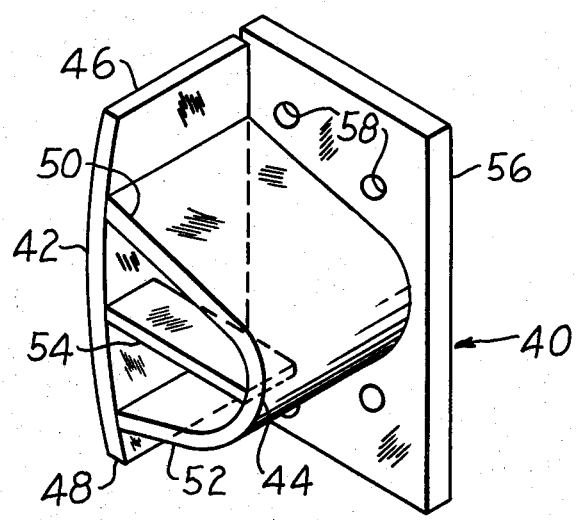
Fig-4-
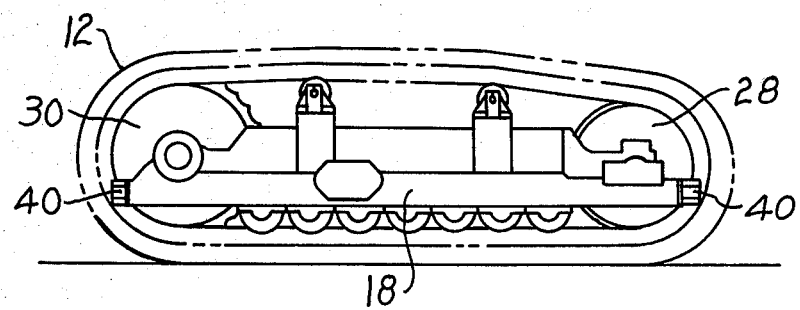

SCRAPING APPARATUS FOR TRACK-TYPE VEHICLES

BACKGROUND OF THE INVENTION

A track-type vehicle, such as a crawler tractor, has a pair of endless tracks mounted on either side thereof to propel the tractor in both a forward and a rearward direction. Each track is normally entrained about an idler and driven by a sprocket wheel rotatably mounted on the tractor. During normal operation in moist soil, the track picks up abrasive foreign material which adheres to the track and decreases the traction of the tractor and accelerates wear of the sprocket wheel and other critical components. A crawler tractor is steered by forced track skewing. This skewing action causes the track to pick up foreign material and carry this material in the track which also causes accelerated wear of critical components. To insure proper operation, foreign material must be removed from the track during operation in both the forward and rearward directions. Any device which breaks up foreign material as the tractor moves in one direction only is insufficient to insure proper operation of the vehicle. This is particularly true since track-type vehicles normally spend a large portion of their time moving in a rearward direction.

The present invention is directed to overcoming one or more of the problems as set forth above.

According to the present invention, a scraping apparatus is provided for a track-type vehicle which has a track. The scraping apparatus has a first and second scraping element each having first and second opposed cutting edges. The scraping apparatus removes foreign material from the track during forward and rearward movement of the track.

BRIEF DESCRIPTION OF THE DRAWINGS

FIG. 3 is a perspective view of the present invention; and

FIG. 4 is a side view of a conventional track-type tractor incorporating the present invention.

DETAILED DESCRIPTION OF THE INVENTION

Figure 1:
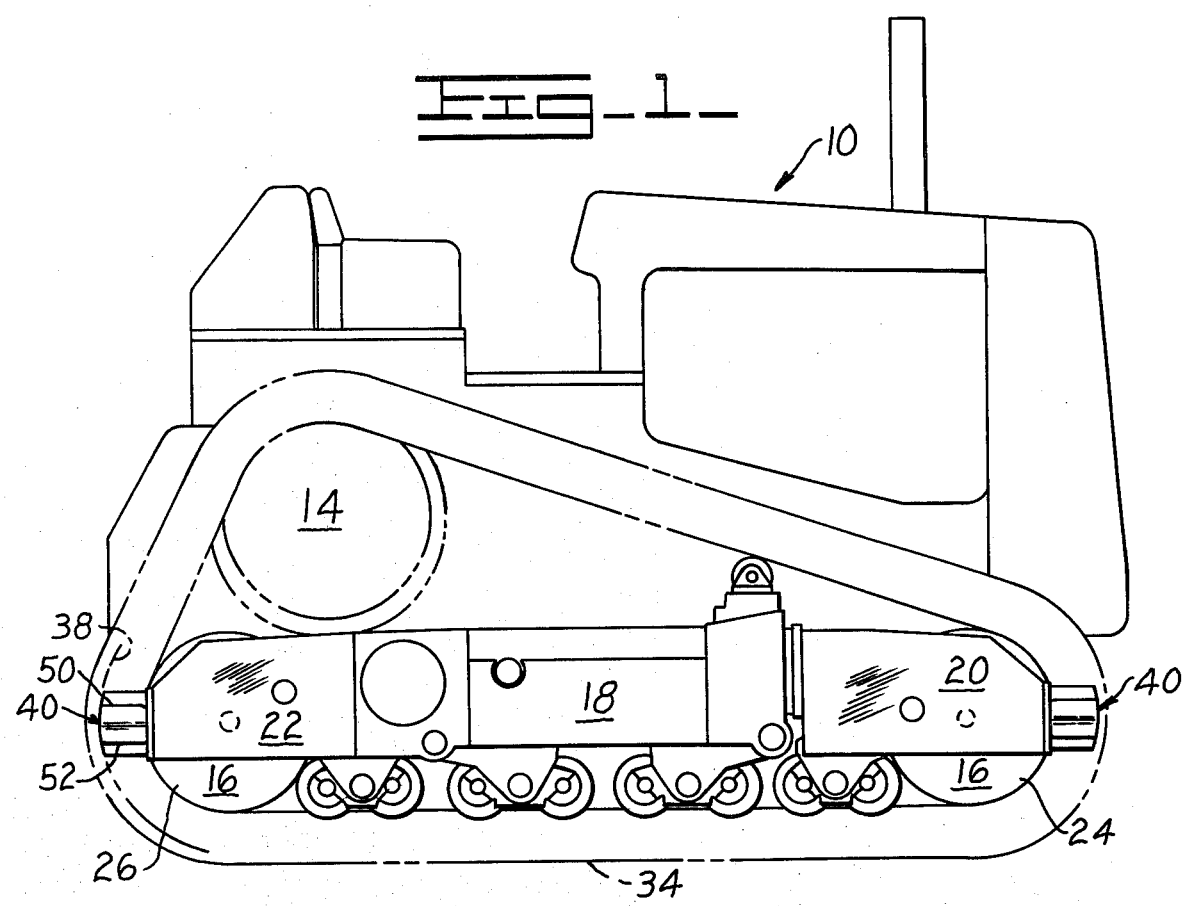
FIG. 1 is a side view of a track-type tractor with an elevated sprocket drive wheel incorporating the present invention.

Referring to FIG. 1, a track-type vehicle, such as a crawler tractor 10, has an endless track 12 disposed on either side thereof. Each track 12 is entrained about a sprocket drive wheel 14 and one or more idlers 16. The idlers 16 are movably mounted on a frame 18 which has front and rear end portions 20 and 22. There are preferably front and rear idlers 24 and 26, respectively mounted on the end portions 20 and 22. The sprocket 14 can be at a higher elevation than the idlers 24 and 26. A single idler 28 generally aligned with a sprocket drive wheel 30 (FIG. 4) can also be used.

Figure 2:
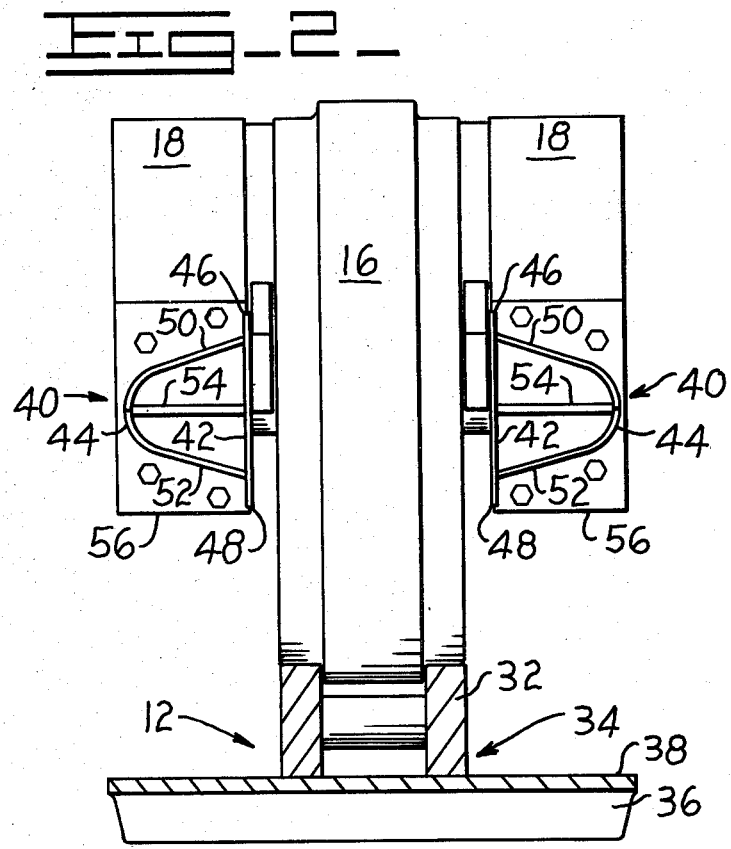
FIG. 2 is a somewhat enlarged end view of the idler with the track removed to reveal the present invention.

Referring to FIG. 2, the endless track 12 has a number of links 32 pivotally connected together to form a chain 34. A shoe 36 has a surface 38 and the shoes are connected to the links 32 in the chain 34.

In the present invention, a scraping apparatus 40 is attached to one or both end portions 20 and 22 of the frame 18 (FIG. 1) and attached on one or both sides of the idlers 16. The scraping apparatus 40 is preferably at a lower elevation than the sprocket drive wheel 14. Referring to FIG. 3, the scraping apparatus 40 has first and second scraping elements 42 and 44, respectively. The first scraping element 42 has first and second opposed cutting edges 46 and 48, respectively. The first scraping element 42 has a construction preferably of a strong, durable, wear-resistant material, such as plate steel or the like, sufficient for removing foreign material from the chain 34. One of the respective cutting edges 46 and 48 of the first scraping element 42 removes foreign material from the chain 34 during forward movement of the chain and the other cutting edge removes foreign material during rearward movement of the chain. The first scraping element 42 has a preferably curvilinear configuration sufficient for spacing the cutting edges 46 and 48 a preselected distance from the chain 34 in the installed position.

The second scraping element 44 has first and second opposed cutting edges 50 and 52, respectively. The second scraping element 44 has a construction sufficient for removing foreign material from the shoes 36 along surface 38 and is preferably constructed of material similar to that used to construct the first scraping element 42. One of the respective cutting edges 50 and 52 removes foreign material from the shoes 36 during forward movement of the shoes and the other cutting edge removes foreign material from the shoes 36 during rearward movement of the shoes. The second scraping element 44 preferably has a general "C" configuration sufficient for spacing the cutting edges 50 and 52, a preselected distance from the shoes 36 in the installed position. The first and second scraping elements 42 and 44 form a generally triangular configuration (FIG. 2).

The scraping apparatus 40 includes a brace 54 connected to and extending between the first and second scraping elements 42 and 44, respectively. The scraping apparatus also includes a plate 56 on which the scraping elements 42 and 44 are mounted. The brace 54 can also be mounted on the plate 56. The plate 56 preferably has a number of holes 58 for movably mounting the plate on the end portions 20 and 22 of the frame 18. The plate 56 is removably mounted, as by a nut and bolt assembly or the like (not shown). A shim (not shown) can be used to adjust the plate 56 to position the four cutting edges 46, 48, 50 and 52 at preselected positions relative to the track 12. It may be desirable, for instance, to position the cutting edges 46, 48, 50 and 52 close to the track 12, within a half inch or so, when operating in mud or moist soil alone. When operating in moist soil containing rocks, it may be desirable to position the cutting edges 46, 48, 50 and 52 at a distance greater than an inch or so. In this way the cutting edges 46, 48, 50 and 52 can be adjusted to compensate for track movement caused by movement of the idlers 16, a loose or worn track, or various other conditions.

In the operation of a track-type tractor 10, the sprocket wheel 14 drives the endless track 12 to propel the tractor 10 and track 12 in both the forward and rearward directions. The scraping apparatus 40 removes foreign material from the chain 34 and shoes 36 of the track 12 as the tractor 10 operates in the forward and rearward directions. The cutting edges 46, 48 and 50, 52 of each scraping element 42, 44 which function to remove foreign material from the track 12 are the particular cutting edge of each apparatus first contacted by the track when going in a forward or rearward direction. The material removed from the chain 34 by the first scraping element 42 is urged onto the second scraping element 44 where it joins material removed from the shoes 36 by the second scraping element 44. The generally "C" shaped second scraping element 44 urges material away from the chain 34 towards the outside of the track 12.

Other aspects, objects, and advantages of the present invention will become apparent from a study of the specification, drawings, and appended claims.

The embodiments of the invention in which an exclusive property or privilege is claimed are defined as follows:

1. A scraping apparatus for a track-type vehicle having a frame, a wheel having a vertical diameter and a horizontal diameter and an endless track having a chain and shoes, said endless track being entrained about the wheel with a portion of the track tangent to the wheel at the horizontal diameter being horizontally displaced from a portion of the track aligned with the vertical diameter, comprising:

a first generally planar scraping element having first and second opposed cutting edges, and a curved edge extending between the first and second cutting edges, said first cutting edge lying above a horizontal plane containing the horizontal diameter, said second cutting edge lying below the horizontal plane, said first scraping element being positioned substantially vertically parallel to the portion of the track chain which is tangent to the wheel at the horizontal diameter, said curved edge curving from its center toward the vertical diameter; and a second scraping element having first and second cutting edges which form a general "C" configuration and being connected to the first scraping element, said first cutting edge having one end connected to the first scraping element adjacent the curved edge above the horizontal plane, said second cutting edge having one end connected to the first cutting element adjacent the curved edge below the horizontal plane, said cutting edges having their other ends connected substantially at the horizontal plane.

2. An apparatus, as set forth in claim 1, wherein said track-type vehicle includes an idler movably connected to one end of the frame, said scraping apparatus is connected to said one end of the frame, and a sprocket drive wheel of the track is positioned at a higher elevation than said scraping apparatus.

3. An apparatus, as set forth in claim 2, including a plate fixedly connected to the first and second scraping elements and being movably connected to the frame.

4. An apparatus, as set forth in claim 1, wherein the first scraping element is of a curvilinear configuration and is of dimensions sufficient for spacing the respective first and second cutting edges a preselected distance from the chain in the installed position.

5. An apparatus, as set forth in claim 1, wherein the second scraping element is of a general "C" configuration and is of dimensions sufficient for spacing the respective first and second cutting edges a preselected distance from the shoes in the installed position.

6. An apparatus, as set forth in claim 1, including; a brace connected to and extending between the first and second scraping elements.

7. A scraping apparatus comprising:

a first scraping element having first and second surfaces and first and second opposed cutting edges lying between the surfaces; and a second scraping element having first and second cutting edges and being connected to said first scraping element, said second scraping element cutting edges lying within a plane surface generally perpendicular to a plane surface bounded by said first scraping element cutting edges said first and second cutting edges being of a curved configuration converging from the first scraping element toward a point at which the cutting edges are connected.

8. An apparatus, as set forth in claim 7, including a mounting plate connected to said first and second scraping elements in opposed relation to said second scraping element cutting edges and generally parallel thereto.

* * * * *